United States Patent [19]

Kubo et al.

[11] Patent Number: 5,170,029
[45] Date of Patent: Dec. 8, 1992

[54] ENERGY-BEAM WELDING METHOD

[75] Inventors: Masao Kubo; Yoshimitsu Nakamura; Yosiyuki Uchinono; Norio Yoshida, all of Kadome, Japan

[73] Assignee: Matsushita Electric Works, Ltd., Osaka, Japan

[21] Appl. No.: 680,108

[22] Filed: Mar. 28, 1991

[30] Foreign Application Priority Data

Apr. 19, 1990 [JP] Japan ................. 2-104223

[51] Int. Cl.⁵ .............................. B23K 15/00
[52] U.S. Cl. ................................. 219/121.14
[58] Field of Search ............... 219/121.14, 121.13, 219/121.74, 121.78, 121.64, 121.63

[56] References Cited

U.S. PATENT DOCUMENTS

| | | | |
|---|---|---|---|
| 3,463,898 | 8/1969 | Takaoka et al. | 219/121.63 |
| 3,586,816 | 6/1971 | Hagen | 219/121.64 |
| 3,614,832 | 10/1971 | Chance et al. | 29/626 |
| 4,327,277 | 4/1982 | Daly | 219/121.64 |
| 4,534,811 | 8/1985 | Ainslie et al. | 219/121.63 X |
| 4,697,061 | 9/1987 | Spater et al. | 219/121.64 |
| 4,700,044 | 10/1987 | Hokanson et al. | 219/121.63 |
| 4,794,231 | 12/1988 | Banas et al. | 219/121.63 |
| 5,029,243 | 7/1991 | Dammann et al. | 219/121.77 |

Primary Examiner—C. L. Albritton
Attorney, Agent, or Firm—Leydig, Voit & Mayer

[57] ABSTRACT

An energy-beam welding method for two metal pieces is performed by bringing a cylindrical jig into axial engagement with one of the metal pieces at welding zone between them which are placed as joined, and irradiating an energy beam to the welding zone through the cylindrical jig in its axial direction, causing at least part of the energy beam reflected on inner peripheral wall of the cylindrical jig to be directed to the welding zone, whereby the metal pieces are mutually welded easily reliably.

12 Claims, 3 Drawing Sheets

FIG.1A
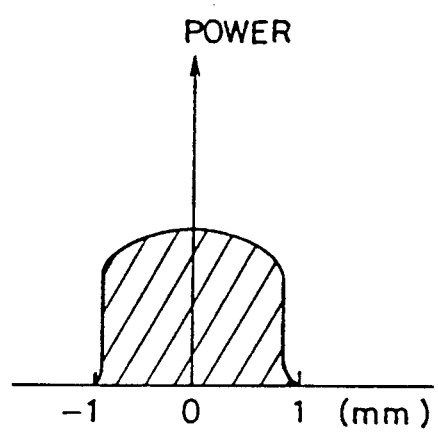
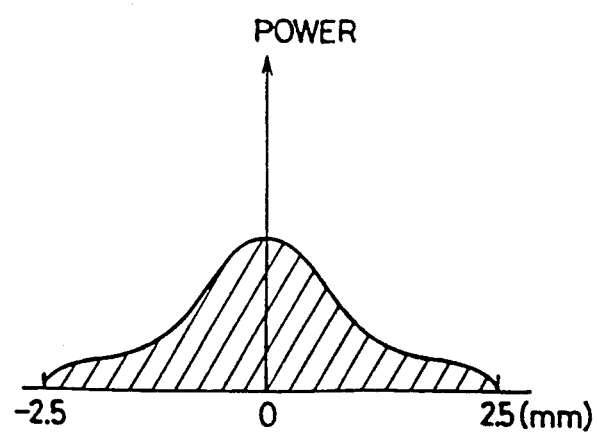
FIG.1B

ENERGY-BEAM WELDING METHOD

BACKGROUND OF THE INVENTION

This invention relates to an energy-beam welding method for mutually welding metal pieces with an energy beam such as laser beam, electron beam or the like.

The energy-beam welding method of the kind referred to can be effectively utilized in, for example, welding contact members.

DESCRIPTION OF RELATED ART

Known welding methods employing energy beams such as soldering with a laser beam and brazing also employing laser beam have heretofore suggested. An example of the laser-beam soldering method is disclosed in Japanese Laid-Open Patent Publication No. 60-182194 of Shigeki Yabu, in which one of the conductor-carrying substrates is placed under pressure from a gas to ensure intimate contact between conductors on the substrates through stable heat transmission of the laser beam for the soldering of the conductors. With this soldering method, however, there has arisen a problem in that achieving the required gas pressure control has been rather cumbersome and, the amount of pressure used has to be restricted. An example of the laser-beam brazing method is described in Japanese Laid-Open Patent Publication No. 61-226167 of Tsutomu Meshikawa et al., in which a concave reflector is employed for converging the laser beam in wider radial direction to a brazing part and unifying heat input, so as to increase the reliability of the welding. With this method of Meshikawa, however, it is required to use a reflector other than the welding jig. Consequently, there arises a problem in that the required adjusting administration of the reflector becomes complicated and troublesome.

SUMMARY OF THE INVENTION

A primary object of the present invention is, therefore, to provide an energy-beam welding method capable of overcoming the foregoing problems in the known methods and easily and reliably welding metal pieces to each other.

According to the present invention, this object can be realized by an energy-beam welding method wherein two metal pieces are vibrated at a supersonic speed to form a provisional connection. A jig is placed on one of the metal pieces and an energy beam is irradiated from above the jig to have the one metal piece welded to the other metal piece, characterized in that the jig is of a cylindrical shape, and the energy beam is caused to at least partly reflect on an inner peripheral wall of the cylindrical jig.

Other objects and advantages of the present invention shall become clear in view of the following description of the invention with reference to preferred embodiments shown in accompanying drawings.

BRIEF DESCRIPTION OF THE DRAWINGS

FIG. 1A is an explanatory diagram for an irradiated spot distribution of a laser beam according to the energy-beam welding method of the instant invention;

FIG. 1B is an explanatory diagram for an irradiated spot distribution of a laser beam in an ordinary method;

Figure 2:
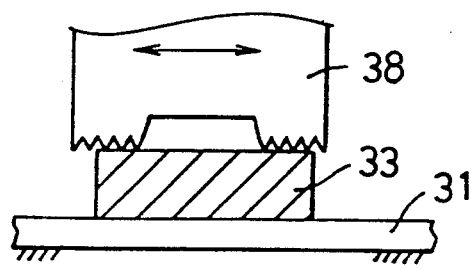
FIGS. 2 to 5 are explanatory sectioned views for respective supersonic vibrational provisional holding steps according to the present invention.

While the present invention shall now be explained with reference to the respective embodiments shown in the drawings, it should be appreciated that its intention is not to limit the present invention only to such embodiments shown but to cover all alterations, modifications and equivalent arrangements possible within the scope of appended claims.

DETAILED DESCRIPTION OF THE PREFERRED EMBODIMENTS

Referring to FIG. 2 there is provided a setup in which a metal piece is provisionally held by another metal piece by means of a supersonic horn at the initial stage of execution of the energy-beam welding method. In FIG. 2, there is shown an embodiment of this feature, wherein a metal piece 33 is brought into contact with a predetermined position on a separate metal piece 31. A supersonic horn 38 is placed on the metal piece 33, and is driven in horizontal directions with respect to the metal piece 33, a supersonic vibration is thereby provided to the metal piece 33 so as to have it provisionally held by the metal piece 31. At this time, such impurities as oxide film, oil film and the like present on welding surfaces of the both metal pieces 31 and 33 can be effectively removed by the supersonic vibration provided by means of the supersonic horn 38. As a result, it is not required to employ any activator for removing impurities. In addition, it is possible that a diffusion reaction of electrons is caused to occur at the welding surfaces of both metal pieces by the provision of the supersonic vibration although the welding metal pieces are not fused directly by the heat input due to the irradiation of the energy beam, the metal pieces of Ag and Cu, for example, will form an alloy layer of Ag-Cu due to a diffusion eutectic crystal reaction of elements, and a stable welding is to be achievable. Thus, with the provision of the supersonic vibration, such impurities as the oxide film, oil film and the like on the welding surfaces can be removed due to supersonic friction caused to occur by the vibration, and both metal pieces are provisionally held together effectively through the clean welding surfaces and brought into intimate and close contact with each other.

Figure 3:
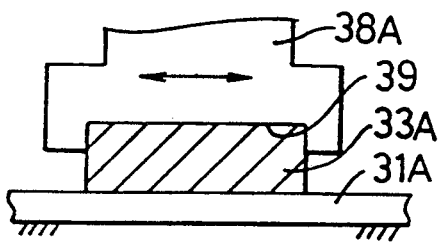

In another embodiment shown in FIG. 3, there is shown a setup for causing the metal piece 31A to be provisionally held by the metal piece 33A in the same manner as in the embodiment of FIG. 2, except for a use of a supersonic horn 38A having a recess 39 adapted to fit the metal piece 33A.

Figure 4:
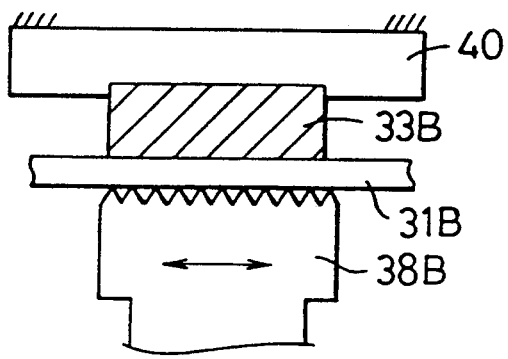

In another embodiment shown in FIG. 4, there is shown a setup for causing the metal piece 31B to be provisionally held by the metal piece 33B in the same manner as in the embodiment of FIG. 2 except that the metal piece 33B is secured at its top side surface to a fixing member 40 and the supersonic horn 38B is engaged to bottom side surface of the metal piece 31B.

Figure 5:
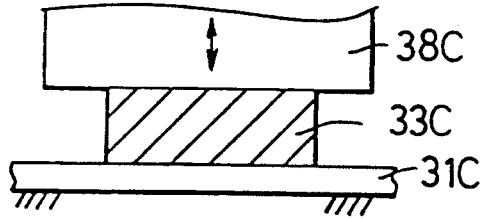

In still another embodiment of FIG. 5, there is shown a setup for causing the metal piece 31C provisionally held by the metal piece 33C in the same manner as in the embodiment of FIG. 2, except that the supersonic horn 38C opposed to the metal piece 33C is driven in vertical directions with respect to the other metal piece 33C.

Figure 6:
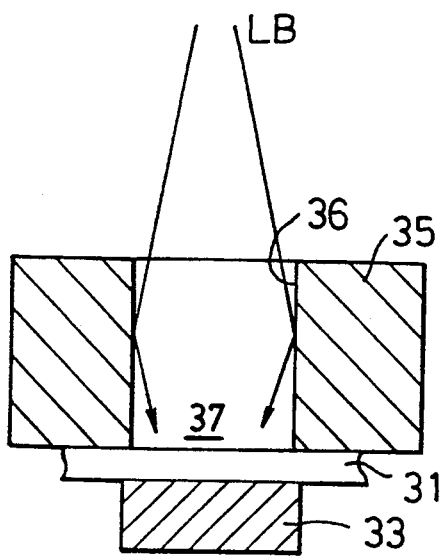
FIGS. 6 and 7 are schematic vertical sections of a cylindrical jig according to the present invention.

After having the both metal pieces provisionally held to each other in the manner shown in FIGS. 2 to 5, the cylindrical jig 35 is placed on the one metal piece 31 as shown in FIG. 6, thereafter the laser beam LB as the energy beam is caused to be irradiated from upper side of the cylindrical jig 35 with part of the laser beam LB caused to reflect on the inner peripheral wall 36, and the metal pieces 31 and 33 are mutually welded. It is possible also in this case to interpose the brazing filler or solder between the metal pieces 31 and 33, if so desired.

Figure 7:
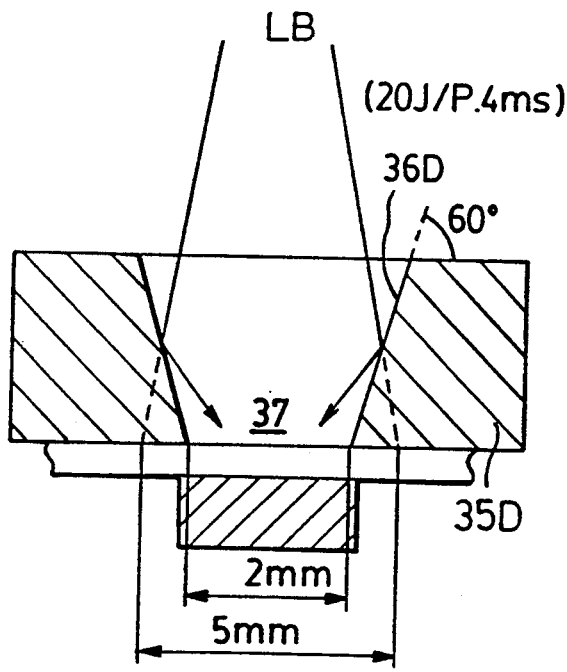

Thus, as shown in FIG. 1A, the energy intensity distribution of the laser beam LB irradiated is made substantially uniform in such irradiation zone 37 as that defined by the inner peripheral wall 36 of the cylindrical jig 35 so that, in contrast to a case relying on such nonuniform energy intensity distribution of the laser beam irradiated without using the cylindrical jig 35 as shown in FIG. 1B, an easier and more reliable welding between the metal pieces 31 and 33 can be assured. As shown in FIG. 7, on the other hand, the inner peripheral wall 36D of the cylindrical jig 35D may be formed in the tapered shape. In this case, it has been found possible to attain excellent energy intensity distribution of the laser beam LB as has been disclosed with reference to FIG. 3A when the inner peripheral wall 36D is made to have a tapered angle set to be 60° with respect to a horizontal plane and a lower convergent end diameter set to be 2 mm, while the laser beam LB is set to have a spot diameter of 5 mm and, in addition, an irradiation power substantially of 20 J/P. 4 ms.

Thus in the respective embodiments of FIGS. 2 to 7, the intensity distribution of the laser beam LB irradiated from upper side of the cylindrical jig can be made substantially uniform as has been described with reference to FIG. 1A.

Figure 8A:
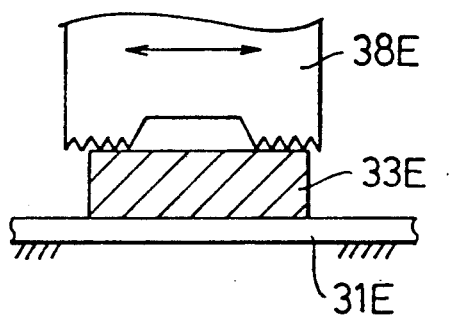
FIG. 8 is a sectional view of a supersonic horn according to the present invention.
FIG. 8b is a schematic view of an optical system according to the present invention.
Figure 8B:
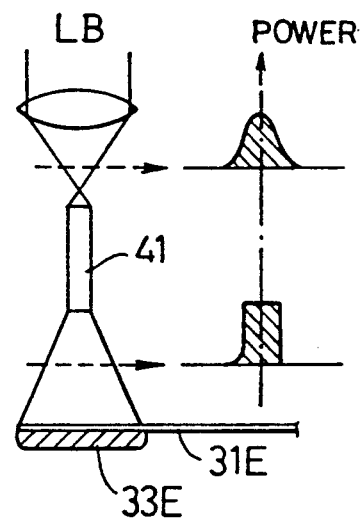

According to a further feature of the present invention, as shown in FIGS. 8A and 8B, the supersonic vibration is provided by means of the supersonic horn 38E to the other metal piece 33E in the same manner as in the embodiment of FIG. 2, so as to have this metal piece provisionally held by the one metal piece 31E. Thereafter an energy beam, preferably a laser beam, is irradiated with the desired intensity distribution directed to the one metal piece 31E by an optical system adapted therefor instead of the cylindrical jig, accordingly, both metal pieces 31E and 33E are mutually welded together while controlling the state of heat input. As a means for deviating the beam to the desired intensity distribution, concretely, it may be possible to employ a collide scope 41, which deviates the beam originally nonuniform in intensity distribution into a beam of substantially uniform intensity distribution so as to provide to the welding portion of the metal pieces 31E and 33E a most effective irradiation of the energy beam. In this case, as the deviating means for the desired intensity distribution, it is possible to employ energy-beam deviating optical systems other than the collide scope 41 so long as the system can attain the desired intensity distribution. Regarding the provisional holding of the other metal piece 33E to the one metal piece 31E, it will be readily appreciated that brazing filler or solder can be interposed between the metal pieces 31E and 33E.

Figure 9:
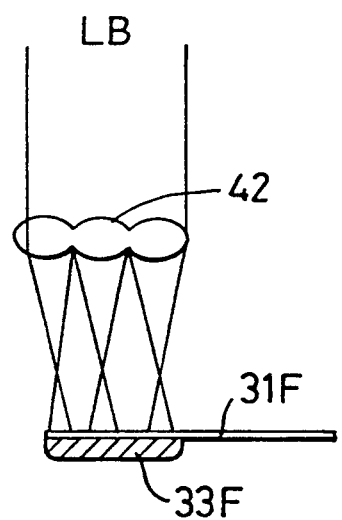
FIGS. 9 and 10 are explanatory views of optical systems for further embodiments of the present invention.

Further, it is also possible to achieve the desired uniform energy intensity distribution by employing an optical system such as the one shown in FIG. 9. There, focusing the energy beam onto the metal pieces 31F and 33F is divided by a multiple focusing lens 42 so as to execute the irradiation with a controlled state of heat input at the welding portion of the metal pieces 31F and 33F.

Figure 10:
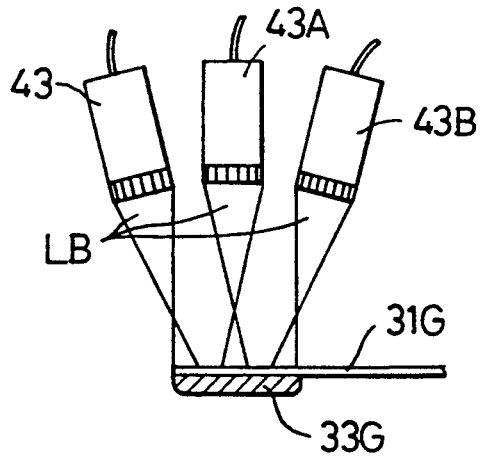

In yet another embodiment, a plurality of energy beams, as shown in FIG. 10 are irradiated onto the metal pieces 31G and 33G, by means of a plurality of energy beam sources 43, 43A 43B . . . so as to control the state of heat input with respect to each welding portion of the metal pieces 31G and 33G. In the instances of FIGS. 9 and 10, further, the desired uniform intensity distribution can be attained by scanning each energy beam source in a proper irradiation mode. Further, such other measures and their functions as the provisional holding of the other metal piece to the one metal piece and so on are the same as those in the foregoing embodiment of FIG. 8A.

For the foregoing energy beam, it is also possible to similarly employ an electron beam other than a laser beam. In the respective foregoing embodiments, it is possible to remarkably improve the absorption effect of the energy beam to stabilize the mutual welding of the metal pieces, by means of a spraying of $O_2$ gas onto the welding portion of the metal pieces upon the irradiation of the energy beam, in particular, the laser beam, a provision of unevenness of, for example, 1 to 100 μm, or their combination.

What is claimed is:

1. A method for welding two contiguous metal pieces with an energy beam comprising the steps of:
   vibrating one of said metal pieces at a supersonic speed to have one of the metal pieces provisionally held to the other metal piece, and
   irradiating one of said metal pieces with an energy beam to weld said metal pieces together.

2. The method of claim 1 further comprising the step of interposing a brazing filler between said metal pieces.

3. The method of claim 1 further comprising the step of placing a light absorbing means on an irradiating zone defined on said metal pieces by a jig which has a cylindrical shape.

4. The method of claim 1 further comprising the step of placing a jig of a cylindrical shape on one of said metal pieces, and irradiating a metal piece from above the jig with an energy beam so that at least part of the beam is caused to be reflected on an inner peripheral wall of the cylindrical jig.

5. The method of claim 4 wherein the inner peripheral wall of said cylindrical jig is tapered.

6. The method of claim 1 wherein said energy beam forms a plurality of irradiation spots.

7. The method of claim 1 wherein said energy beam is a laser beam.

8. The method of claim 7 further comprising the step of passing the laser beam through an optical system to obtain a beam having a desired intensity distribution.

9. The method of claim 1 wherein said energy beam is an electron beam.

10. The method of claim 1 further comprising the step of interposing a solder between the metal pieces.

11. A method of welding two metal pieces comprising the steps of:

stacking the metal pieces in a contiguous arrangement;
vibrating one of the metal pieces at a supersonic speed so that the metal pieces are provisionally held together;
placing a cylindrical jig on one of the metal plates; and
irradiating an irradiation zone of one of the metal plates with an energy beam so that at least part of the beam is caused to be reflected from an inner peripheral wall of the jig onto the irradiation zone of the metal piece.

12. The method of claim 11 further comprising the step of placing a light absorbing element on the irradiation zone.

* * * * *